United States Patent [19]
Brook

[11] 4,180,916
[45] Jan. 1, 1980

[54] GYROSCOPIC INSTRUMENTS

[75] Inventor: David L. Brook, Watford, England

[73] Assignee: S. G. Brown Limited, Watford, England; a part interest

[21] Appl. No.: 818,835

[22] Filed: Jul. 25, 1977

[30] Foreign Application Priority Data

Jul. 23, 1976 [GB] United Kingdom ............... 30933/76

[51] Int. Cl.² .............................................. G01C 19/28
[52] U.S. Cl. ....................................... 33/318; 33/322; 74/5.34
[58] Field of Search ............... 74/5.34; 33/317 R, 323, 33/321, 318, 32.2, 324, 317 D

[56] References Cited
U.S. PATENT DOCUMENTS 3,477,298  11/1969  Howe ..................................... 74/5.34

Primary Examiner—William D. Martin, Jr.
Attorney, Agent, or Firm—Young & Thompson

[57] ABSTRACT

A gyrocompass comprises a gyroscopic element having a stabilizing gyro with a relatively heavy rotor rigidly secured to a driving shaft and a control gyro with a rotor of lower inertia mounted on the same driving shaft as a free rotor gyro. A case enclosing the gyroscopic element and a drive motor is mounted in a vehicle with the spin axis in the north south plane in gimbals with a nominally vertical outer axis and an inner or tilt axis in the east-west plane. The stabilizing gyro is slaved to the control gyro by means of signals from pick-offs associated with the latter so as to zeroise misalignment, and the tilt gimbal is pendulous to provide a gravity reference, so that the azimuth misalignment signal between the gyros generates an opposing tilt torquer current which is a measure of the gyro tilt angle.

18 Claims, 3 Drawing Figures

GYROSCOPIC INSTRUMENTS

The invention relates to gyroscopic instruments.

According to the invention a gyroscopic instrument comprises a stabilising gyro and a control gyro mounted on a common driving shaft, the rotor of the stabilising gyro being rigidly mounted on the shaft and the rotor of the control gyro being mounted on the shaft by means permitting the polar axis of the control gyro to move through a small angle from colinearity with the stabilising gyro. The angular momentum of the control gyro is preferably small compared with that of the stabilising gyro.

The instrument of the invention is provided with pick-offs, which measure any angular misalignment between the polar axis of the stabilising gyro and the axis of the control gyro, and with torquers for generating a torque reaction between the two gyros.

The gyros and shaft, together with a drive motor, are received in a case rotatably mounted on an axis parallel to the spin axis and so balanced that the orthogonal axes of the pick-offs and torquers are normally parallel and at right angles to the local vertical. The instrument is mounted on a pair of outer gimbals providing angular freedom in tilt about a normally horizontal axis at right angles to the spin axis, and angular freedom about an azimuth axis, which is arranged in use to be at right angles to a normally horizontal surface of the vehicle.

The angular misalignment between the control gyro and the stabilising gyro measured by the pick-offs provides signals which are used to actuate the torquers acting on the stabilising gyro so as to cause the spin axis of the latter always to be aligned to the spin axis of the control gyro to a high degree of accuracy.

To enable the instrument to operate as a gyrocompass, the tilt gimbal of the stabilising gyro is made intrinsically pendulous, so providing the gravity reference necessary for gyrocompass operation. The signal from the azimuth pick-off of the control gyro then becomes a measure of the tilt of the spin axis of the stabilising gyro, and this signal, after processing if desired, can be used to operate the torquers acting between the stabilising gyro and the control gyro.

By way of illustration, a gyrocompass embodying the invention is described below with reference to the accompanying drawings, in which.

Figure 1:
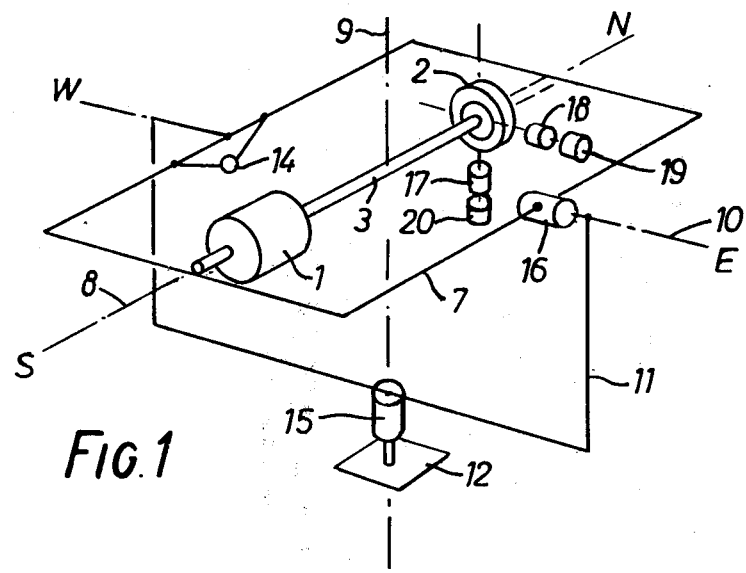
FIG. 1 is a schematic perspective view of the main components of the gyrocompass.
Figure 2:
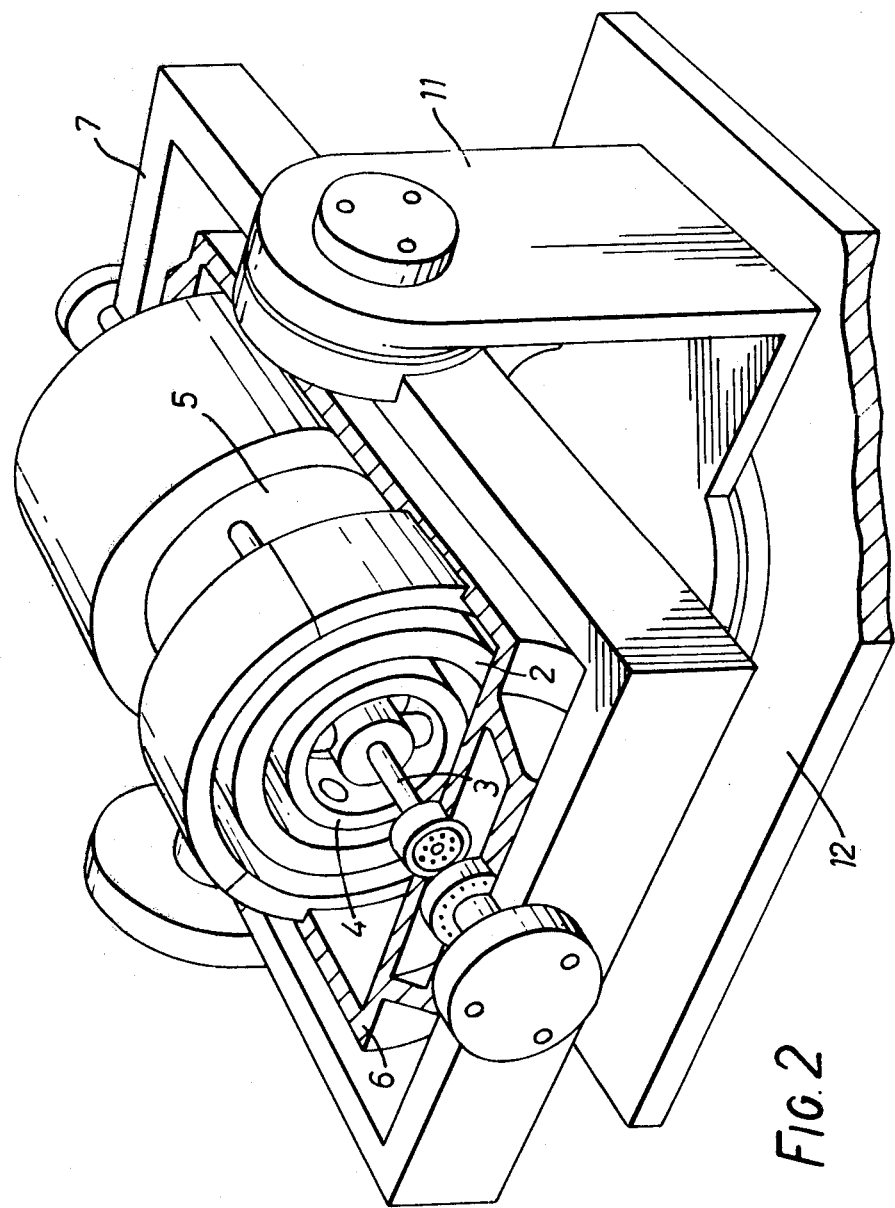
FIG. 2 is a perspective view of the gyrocompass, with a case containing the sensitive elements shown as partly broken away.

The gyroscopic element of the illustrated gyrocompass as shown in FIGS. 1 and 2 comprises a stabilising gyro 1 and a control gyro 2, mounted on a common driving shaft 3. The gyro 1 is a relatively heavy wheel rigidly mounted on the shaft 3. The gyro 2 has a lower inertia, and is mounted on the shaft 3 as a free rotor gyro. The stabilising gyro 1 can conveniently have an angular momentum which is large compared with that of the control gyro 2, for example, about ten times greater.

The free rotor gyro 2 requires a driving assembly, shown in FIG. 2, including an intermediate gimbal 4 by which the rotor is so connected to the shaft 3 that it is maintained in a spinning condition at the same rate as the shaft but its polar axis is free to move from colinearity with that of the shaft. One type of such an assembly is known as a 'dynamically tuned free rotor gyro,' and this form of assembly may, but need not necessarily, but used in the illustrated gyrocompass. The constructional details of the mounting assembly for dynamically tuned free rotor gyros have become well known in the last few years and form no part of the present invention.

The drive means for the driving shaft 3 is a motor 5 (FIG. 2) which is preferably an induction or a synchronous motor. If the control gyro is of the dynamically tuned free rotor type then it is convenient to use a synchronous motor, in order to ensure conformity to the resonant condition needed to obtain the best accuracy from the control gyro 2.

The drive motor, driving shaft and the two gyros are all enclosed in a case 6, which may be cylindrical in shape as partially shown in FIG. 2. The case 6 is rotatably suspended in a tilt gimbal frame 7 on an axis 8 which is colinear with the spin axis of the stabilising gyro 1. This suspension axis is known as the 'free-swing axis,' and the case 6 is made slightly pendulous so that the azimuth axis 9 and the tilt axis 10 relating to the control gyro remain nominally vertical and horizontal respectively. To provide suitable damping for this part of the system, inertia damps (not shown) may be fitted.

The tilt gimbal frame 7 is carried in an azimuth gimbal frame 11 for rotation about the axis 10 which is at right angles to the axis 8, and the frame 11 is mounted by way of an azimuth drive plate 12 in the ship or vehicle for rotation about an axis at right angles to a normally horizontal surface of the vehicle, or "deck plane." The axis is thus nominally vertical, and constitutes the main azimuth axis 9. The second gimbal axis, or tilt axis 10, is nominally horizontal and lies in the east-west planes, the axis 8 being also nominally horizontal and lying in the north-south plane. The main tilt gimbal is made intrinsically pendulous as schematically shown at 14, (FIG. 1), thus providing the gravity reference necessary for the operation of the device as a gyrocompass. The gimbal configuration of the illustrated gyrocompass is thus identical to that of a classical gyrocompass.

The control system of the gyrocompass employs the control gyro 2, which is intrinsically very accurate, to monitor, audit and improve the performance of the stabilising gyro 1.

Figure 3:
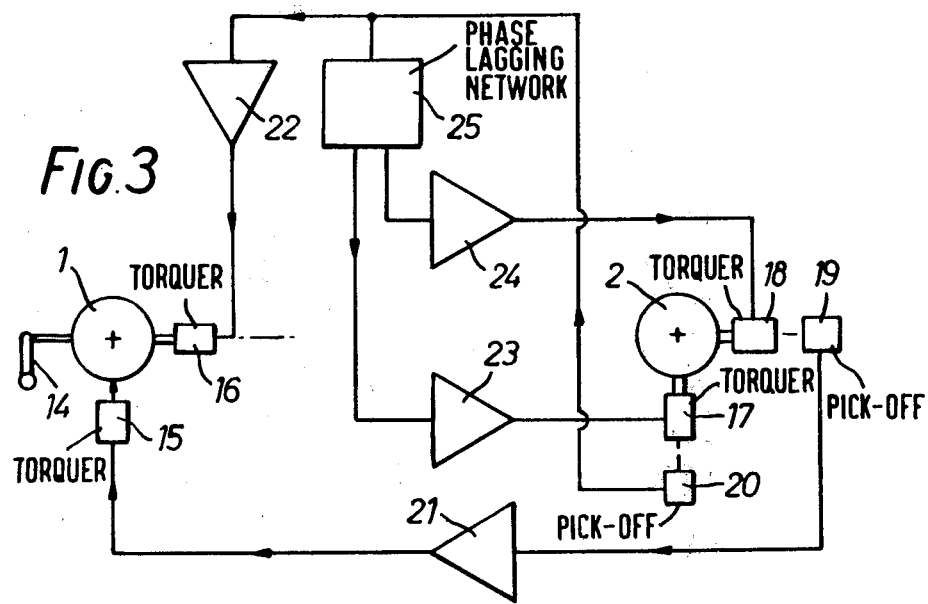
FIG. 3 is a schematic circuit diagram of the control system of the gyrocompass.

To achieve this, the following control elements are provided as shown in FIG. 1 and connected into circuitry as shown in FIG. 3.

The control elements comprise firstly torquers (or torque motors) for operating on the stabilising gyro 1. These comprise an azimuth torquer 15 and a tilt (east-west axis) torquer 16.

Secondly, the control elements include torquers operating on the control gyro 2. These are a control gyro azimuth torquer 17 and a control gyro tilt torquer 18, both acting between the stabilising and control gyros 1, 2.

Finally, the control elements include pick-offs to measure the instantaneous misalignment between the spin axis of the control gyro 2 and that of the stabilising gyro 1. These pick-offs are a control gyro tilt pick-off 19 and a control gyro azimuth pick-off 20.

The stabilising gyro 1 is slaved to the control gyro 2 by using the misalignment signals from the pick-offs 19 and 20, after suitable amplification in respective amplifiers 21, 22, to operate the respective torquers 15, 16 in such a direction as to bring the misalignment signals to zero. The torquers 15, 16 are preferably powerful d.c. gearless motors which have virtually instantaneous response since they provide no reflected inertia which would generate lagging torques on the gyro, being in this respect much better than geared servos.

This form of control loop has two advantages. Firstly, it overcomes the inherent friction (or other error) torques applied by the gimbal bearings, etc., to the stabilising gyro 1. Secondly, by using sufficiently high gain (i.e. time constants as short as a few seconds), it provides extremely good transient response to disturbances due to the motion of the vehicle etc. Windage and off-tune time constants are preferably made large by suitable design of the rotor of the control gyro 2 and its suspension.

A second feature of the control system is the use of the intrinsic pendulosity 14 of the outer tilt gimbal frame 7. Without the presence of the control loops described above, this pendulosity would cause the stabilising gyro 1 to act like a classical gyrocompass, without damping, and with many of the other disadvantages of a classical gyrocompass, notably inter-cardinal rolling errors which arise when a gyrocompass is subject to an oscillatory component of N-S acceleration in a fixed phase relationship with a component of E-W acceleration, as from the rolling of a ship on an inter-cardinal heading. However, with the monitoring control from the gyro 2, an entirely different situation arises. As soon as the main spin axis becomes tilted, a torque appears about the east-west axis acting on the stabilising gyro 1; this gyro will then start to precess in azimuth relative to the control gyro 2, and the azimuth misalignment signal between them will generate an opposing torque through the operation of the outer torquer 16. Thus, in the steady state condition, the magnitude of this torquing current is a measure of the tilt angle of the gyro. Hence, by this means, an ideal torque feedback pendulum has been achieved, and a signal is obtained equivalent to that given by a transmitting pendulum, such as is obtained in gyrocompasses employing transmitting pendulums, or similar devices.

The system as described results in a 'free gyro' which would operate as a directional gyro, provided some means of controlling the drift in tilt were available. This can be achieved by feeding a proportion of the azimuth misalignment signal from the pick-off 20 (which is already conveyed to the main tilt torquer 16) into the vertical axis torquer 17 acting on the control gyro 2. This provides an 'anti-topple' loop such as is commonly found in aircraft directional gyros.

To make the device act as a gyrocompass, the azimuth misalignment signal from the pick-off 20 is used to operate the control gyro torquer 18 acting about its tilt axis 10 to cause the control gyro to precess in azimuth and also to operate the control gyro torquer 17 acting about its azimuth axis to cause the control gyro 2 to precess in tilt. In this manner both gyrocompassing control and gyrocompass damping control are provided. Amplifiers 23, 24 are provided in the connections to the torquers 17, 18 respectively.

It is to be noted that the rotor which really operates as a gyrocompass is the control gyro rotor 2 which may be an accurate dynamically tuned free rotor. The other gyro 1 merely acts as a stabilising element by virtue of its higher gyroscopic inertia.

An important additional feature is that the signals supplied to the torquers 17 and 18 from the pick-off 20 may be 'processed' or 'shaped' to provide better performance. Thus as shown in FIG. 3, the pick-off signal is passed through a phase-lagging network 25 providing a lagging time constant. The most important result of doing this is the reduction of inter-cardinal rolling errors to an acceptably low value. Circuits for providing these transfer functions are known and are therefore not further described.

Means can also be provided to modify the value of the tilt torquing current scaling factor being fed into the control gyro 2 to provide for 'rapid settle.' This is a useful mode of operation when a gyrocompass is first started up.

It is possible in addition to provide electronic limiters (normally in the form of diodes, or transistors operating as limiters) to limit the tilt torquing current to an arbitary value. This is sometimes useful in reducing the magnitude of errors which may occur when the vehicle carrying the gyrocompass is subject to large north-south accelerations resulting from turns or other manoeuvres.

Various other correction elements can be applied by feeding additional signals from analogue generators into the torquers 17, 18 acting on the control gyro 2. The most important of these are corrections for earth's rate of rotation, for effects of northerly velocity, and for fixed (bias) drifts. Similarly, slewing signals can be applied before the gyro is left in the 'rapid settle' phase during the start-up operation.

An analysis of the properties of the illustrated gyrocompass will show that the free-swing axis is used to maintain the average orientation of the control gyro torquing axes in their correct positions, i.e. vertical and horizontal. This is particularly important in use on a vessel when this has a list to port or starboard. The free-swing assembly is unaffected by the angular rolling or pitching of the ship, but is affected by the horizontal oscillatory accelerations arising from such motion. It is therefore advantageous to place the gyrocompass as nearly as possible at the same height as the centre of roll of the vessel.

The output information from the gyrocompass will be the heading of the vehicle in which it is mounted. This information can be displayed by means of a compass-card for direct reading (between the azimuth gimbal and the base of the compass) and/or also transmitted to a remote display device by some electrical form of angular transmission, for example, a synchro or step-by-step motor.

It will be evident that various modifications of the gyrocompass as shown and described are possible within the scope of the invention.

I claim:

1. A gyroscopic instrument comprising a stabilizing gyro having a rotor, a driving shaft, means rigidly mounting said stabilizing gyro rotor on said driving shaft against movement relative to said driving shaft, a control gyro having a rotor, means mounting said control gyro rotor on said driving shaft for limited tilting movement of the control gyro rotor through a small angle from coaxiality with said stabilizing gyro rotor, means for sensing said limited movement, and means responsive to the sensing of said limited movement to apply to said stabilizing gyro rotor a force to restore said coaxiality.

2. The gyroscopic instrument of claim 1 wherein the angular momentum of said control gyro is small compared with the angular momentum of said stabilising gyro.

3. The gyroscopic instrument of claim 1 wherein said means mounting said control gyro rotor on said driving shaft mount said control gyro rotor as a dynamically turned free rotor gyro.

4. The gyroscopic instrument of claim 3 wherein a synchronous motor is provided for driving the driving shaft.

5. The gyroscopic instrument of claim 1, said sensing means comprising pick-off means adapted to measure the angular misalignment between said stabilizing gyro and said control gyro, and said responsive means comprising torquer means adapted to generate a torque reaction between said stabilizing gyro and said control gyro.

6. The gyroscopic instrument of claim 5 wherein said pick-off means comprise two pick-offs adapted to operate respectively on orthogonal axes at right angles to the common spin axis of said stabilising and control gyros, and wherein said torquer means comprise two torquers adapted to operate respectively on said orthogonal axes.

7. The gyroscopic instrument of claim 6 further comprising a frame enclosing said stabilising gyro and said control gyro, and means rotatably mounting said frame on an axis parallel to said spin axis, said frame being so balanced that the orthogonal axis of said pick-offs and said torquers are respectively an azimuth axis normally parallel to the local vertical and a tilt-axis normally at right angles to the local vertical.

8. The gyroscopic instrument of claim 7 wherein said means mounting said frame comprise a pair of outer gimbals, said outer gimbals providing angular freedom in tilt about a normally horizontal axis at right angles to said spin axis, and angular freedom about an azimuth axis extending at right angles to a normally horizontal surface of a vehicle in which the instrument is mounting.

9. The gyroscopic instrument of claim 8 further comprising torque motors adapted to operate about said outer tilt and azimuth axes respectively.

10. The gyroscopic instrument of claim 9 wherein said torque motors are direct-acting d.c. torque motors.

11. The gyroscopic instrument of claim 9 further comprising means responsive to a misalignment signal from said pick-off means to actuate said torque motors in such a manner as to cause the spin axis of said stabilising gyro always to be substantially aligned with the spin axis of said control gyro.

12. The gyroscopic instrument of claim 9 further comprising means rendering said outer tilt gimbal pendulous, whereby the misalignment signal of said azimuth pick-off is a measure of the tilt angle of the gyro.

13. The gyroscopic instrument of claim 12 further comprising means responsive to a misalignment signal from said azimuth pick-off to actuate said control gyro tilt torquer to cause the control gyro to behave as a damped gyrocompass.

14. The gyroscopic instrument of claim 12 further comprising means responsive to a misalignment signal from said azimuth pick-off to actuate said control gyro azimuth torquer, thereby providing an "anti-topple" loop.

15. The gyroscopic instrument of claim 12 further comprising means responsive to a misalignment signal from said azimuth pick-off to actuate said control gyro tilt and azimuth torquers, thereby providing gyrocompassing and gyrocompassing damping control.

16. The gyroscopic instrument of claim 12 further comprising a phase-lagging network adapted to process said azimuth misalignment signal.

17. The gyroscopic instrument of claim 12 further comprising a shaping circuit adapted to process said azimuth misalignment signal to limit the level of said signal to a predetermined value.

18. The gyroscopic instrument of claim 12 further comprising means providing signals for correction of at least one of components of earth rate, northerly speed, northerly acceleration and bias drift errors in the control gyro, for accurate gyrocompassing.

* * * * *